United States Patent [19]

Brisabois

[11] Patent Number: 4,499,791
[45] Date of Patent: Feb. 19, 1985

[54] AUTOMOTIVE VEHICLE DRIVE TRAIN

[75] Inventor: Roger Brisabois, Clamart, France

[73] Assignee: Regie Nationale des Usines Renault, Boulogne-Billancourt, France

[21] Appl. No.: 254,340

[22] Filed: Apr. 15, 1981

Related U.S. Application Data

[60] Division of Ser. No. 939,316, Sep. 5, 1978, Pat. No. 4,308,763, which is a continuation-in-part of Ser. No. 873,575, Jan. 30, 1978, Pat. No. 4,289,045.

[30] Foreign Application Priority Data

| Jan. 31, 1977 | [FR] | France | 77 02560 |
| Sep. 14, 1977 | [FR] | France | 77 27809 |
| Sep. 14, 1977 | [FR] | France | 77 27811 |
| Sep. 14, 1977 | [FR] | France | 77 27810 |

[51] Int. Cl.³ .................. F16H 37/08; F16H 57/02
[52] U.S. Cl. .................. 74/700; 29/469; 29/401.1; 403/4; 74/695; 74/606 R
[58] Field of Search ........... 74/700, 695, 694, 606 R; 403/3, 4; 29/401.1, 469; 192/112, 115

[56] References Cited

U.S. PATENT DOCUMENTS

| 1,983,955 | 12/1934 | Soden-Fraunhofen | 74/700 |
| 2,034,141 | 3/1936 | Gustafson | 74/700 |
| 2,680,377 | 6/1954 | Gerst | 29/469 |
| 2,844,973 | 7/1958 | Hill | 74/700 |
| 2,890,772 | 6/1959 | Bixby | 74/700 |
| 3,035,455 | 5/1962 | Péras | 74/700 |
| 3,101,010 | 8/1963 | Popovich | 74/700 |
| 3,216,104 | 11/1965 | O'Shields | 29/469 |
| 3,474,690 | 10/1969 | Lepelletier | 74/695 |
| 3,611,832 | 10/1971 | Vollmer | 74/700 |
| 3,645,147 | 2/1972 | Fodrea | 74/375 |
| 3,648,544 | 3/1972 | Tanaka | 74/695 |
| 3,703,031 | 11/1972 | Fodrea | 74/333 |
| 4,041,791 | 8/1977 | Coy | 29/469 |
| 4,056,988 | 11/1977 | Kubo et al. | 74/695 |

FOREIGN PATENT DOCUMENTS 2069026 11/1970 France .

Primary Examiner—Allan D. Herrmann
Assistant Examiner—D. Wright
Attorney, Agent, or Firm—Beveridge, DeGrandi and Kline

[57] ABSTRACT

A longitudinally mounted drive train for an automotive vehicle usable with either a manual transmission or an automatic transmission. A housing encloses a clutch in the manual drive train or a torque converter in the automatic drive train. The housing is fastened, in the manual drive train, directly onto the housing of the manual transmission or, in the automatic drive train, by means of a bearing support housing to the housing of the automatic transmission. The housing can be formed of two parts. In both drive trains a shaft having a differential bevel pinion can be provided to couple the transmission to a differential to permit front wheel drive or four wheel drive. The use of common components for the normal drive train and for the automatic drive train results in greatly reduced production costs and lower parts inventory.

12 Claims, 7 Drawing Figures

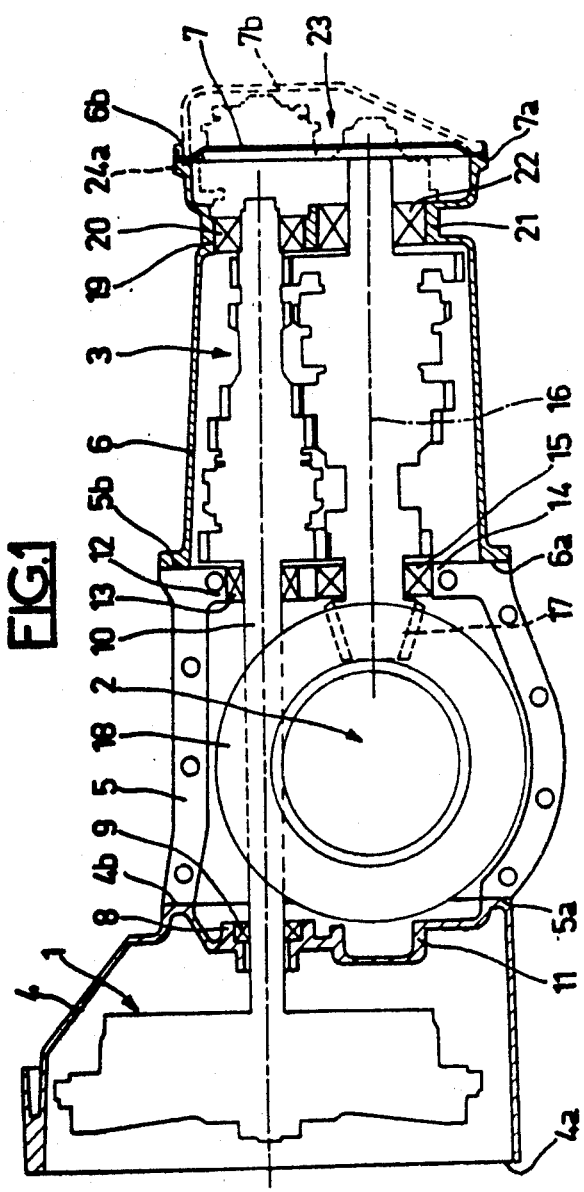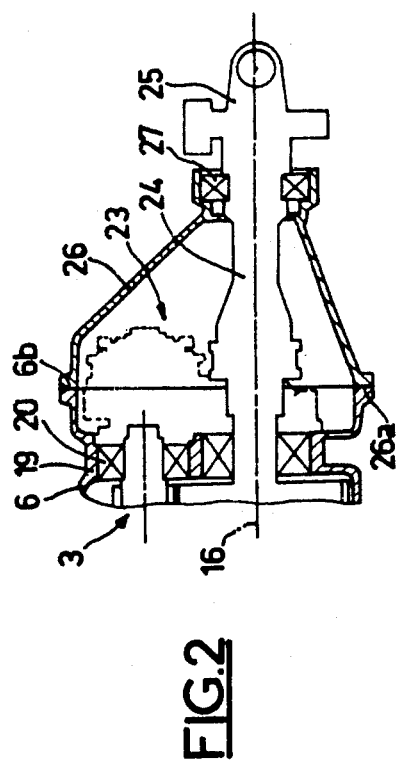

4,499,791

AUTOMOTIVE VEHICLE DRIVE TRAIN

CROSS-REFERENCE TO RELATED APPLICATION

This application is a division of application Ser. No. 939,316 filed Sept. 5, 1978 now U.S. Pat. No. 4,308,763 which is a continuation-in-part of application Ser. No. 873,575 filed Jan. 30, 1978 now U.S. Pat. No. 4,289,045.

BACKGROUND OF THE INVENTION

The present invention pertains to an improvement in the design of power units of automotive vehicles, allowing, as desired, the use of either a manual transmission or an automatic transmission. The present invention further permits the use of either type of transmission in vehicles having front wheel drive and/or four wheel drive, as well as in vehicles having rear wheel drive.

Designing an automotive vehicle power train to be equipped with either a manual transmission or an automatic transmission generally restricts the design of both the manual transmission and the automatic transmission, as well as the other components of the drive train. The various components of the two drive train versions are actually different, not only in size, but also in the positioning of, for example, the input and output shafts of their several components. On the other hand, the adoption of one design of components for use in a manual drive train and of another design of components for use in an automatic drive train involves the need to manufacture and to stock all the different components for both versions, both for initial assembly and for use as replacement parts. Hence, a considerable increase in investment costs is experienced. The problem is further complicated when it is desired to be able to equip vehicles for front wheel drive and/or for four wheel drive, as well as for rear wheel drive.

SUMMARY OF THE INVENTION

The present invention is a longitudinally-mounted drive train for an automotive vehicle which can utilize without significant modification either a manual transmission or an automatic transmission. Further, the present invention can be utilized to provide a vehicle with front wheel drive and/or four wheel drive, as well as rear wheel drive. In this way, the automatic drive train version, which is often available only as a high-priced option, particularly in Europe, can benefit from the lower costs made possible by mass production of the manual drive train version, and a smaller parts inventory is required.

In accordance with the present invention, the clutch in the manual drive train version and the torque converter in the automatic drive train version are positioned within an identical housing so that the same housing can be utilized for either version. One face of this housing is available for connection to an engine housing, while another face is available for connection, in the manual drive train version, directly to a corresponding face of the transmission housing and, in the automatic drive train version, to a corresponding face of an intermediate bearing support housing the other face of which is connected to the face of the automatic transmission housing.

In one preferred embodiment of the present invention, then, the drive train assembly includes, in order, an engine, a clutch or torque converter, and a mechanical transmission or an automatic transmission, and can be utilized in particular in vehicles having rear wheel drive, the motion output taking place on the side of the transmission opposite the engine.

The same drive train elements can also be utilized on vehicles having front wheel drive by inserting a differential between the clutch and the manual transmission or between the torque converter and the automatic transmission. The differential housing has two opposite faces, one of which connects to one face of the clutch housing or of the torque converter housing and the other of which connects, in the manual drive train version, directly to the corresponding face of the manual transmission housing, and, in the automatic drive train version, to the corresponding face of the intermediate bearing support housing which, in turn, connects to the automatic transmission housing.

This latter assembly is also usable on four wheel drive vehicles, provided that the transmission has, in addition to the motion output to the differential, an additional motion output on the side of the transmission opposite the engine.

Preferably, in this embodiment of the present invention the housing which serves either as a clutch housing or a torque converter housing includes, in its face that connects to the manual transmission housing or to the intermediate bearing support housing or to the differential housing, a support for a bearing of the output shaft of the clutch or torque converter and a support for a bearing of output shaft of the manual transmission in the rear wheel drive manual drive train version which does not include a differential.

The differential housing advantageously includes in its face that connects to the manual transmission housing or to the intermediate support housing of the automatic transmission, a support for a bearing of the input shaft of the manual transmission, and a support for a bearing of the output shaft of the manual transmission in the manual drive train version or for a bearing of a lay shaft or intermediate shaft in the automatic drive train version, and these shafts carry a bevel pinion to drive the differential crown wheel.

The intermediate bearing support housing advantageously includes a support for a second bearing for the output shaft of the automatic transmission and a support for a second bearing for the intermediate shaft that carries the bevel pinion to drive the differential crown wheel.

In a second preferred embodiment of the present invention, the housing is made of several parts. In this embodiment the first housing part encloses the clutch in the manual drive train version or the hydrokinetic torque converter in the automatic drive train version, together with a bevel pinion of the differential. This first housing part can be fastened to the vehicle engine at one of its faces. The second housing part of this embodiment encloses a number of pinions, gears, and bearings that support an input shaft of the transmission, a portion of the input bevel pinion of the differential, and, in the automatic drive train a lay shaft or intermediate shaft. The second part of the housing can be fastened by one of its faces, extending substantially perpendicular to the shafts, to the first part of the housing and by its other face, parallel to the first face, directly to the housing of a manual transmission or, by means of a bearing support housing, to the housing of an automatic transmission.

This second embodiment of the present invention further includes a differential cover common to the manual drive train and to the automatic drive train and connected to the first part of the housing at the one of the housing faces by which the housing is connected to the engine. The differential cover closes the portion of the first housing part which receives the input bevel pinion of the differential.

The second part of the housing includes support means suitable in the manual drive train, for mounting a bearing for the output shaft of the manual transmission and, in the automatic drive train, for mounting a bearing for an intermediate double pinion having two different sets of teeth connecting the motion output pinion of the automatic transmission and a drive pinion of the input bevel pinion shaft of the differential. The second housing part further includes support means suitable for mounting two bearings for the input bevel pinion shaft of the differential.

In each embodiment of the present invention the various drive train shafts are supported by the housing in fixed locations so that it is possible to use the housing for a manual drive train or for an automatic drive train without having to modify the surrounding parts, particularly the drive shafts. It is also possible in each embodiment to use the same differential drive and the same differential with either the manual transmission or the automatic transmission to provide front wheel drive and, in the first embodiment, to provide four wheel drive.

BRIEF DESCRIPTION OF THE DRAWINGS

The present invention will be better understood from a study of preferred embodiments set forth in the following description and illustrated by the accompanying drawings, in which:

FIG. 1 is a schematic sectional view depicting a first embodiment of a drive train according to the present invention including a manual transmission and permitting front wheel drive;

FIG. 2 depicts a variant of the drive train of FIG. 1 permitting four wheel drive;

DETAILED DESCRIPTION OF PREFERRED EMBODIMENTS

Figure 3:
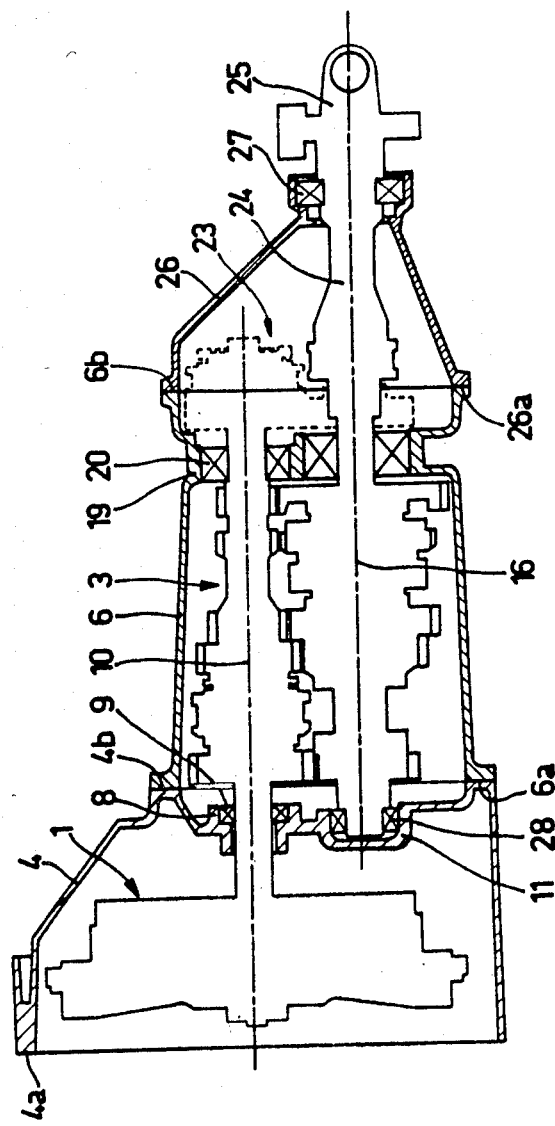
FIG. 3 depicts a further variant of the drive train of FIG. 1 permitting rear wheel drive.

The embodiment of longitudinal drive train of the present invention depicted in FIG. 1 includes, in line, a manual clutch 1, a differential 2 and a manual transmission 3. A housing is provided for each of these components, namely a housing 4 for clutch 1, a housing 5 for differential 2, and a housing 6 for transmission 3.

Housing 4 of clutch 1 includes a first face 4a for connection to the housing of an engine (not shown), and an opposite face 4b for connection to a first face 5a of housing 5 of differential 2. Second face 5b of housing 5 is connected to a first face 6a of housing 6 of transmission 3 whose second face 6b has connected to it a cover plate 7 having a corresponding face 7a.

The second face 4b of housing 4 includes a first support member 8 for a bearing assembly 9 that supports output shaft 10 from clutch 1. Shaft 10 passes through housing 5 to become the input shaft of transmission 3. Additionally, second face 4b includes a second support member 11, the function of which is described hereinafter. The second face 5b of housing 5 includes a first support member 12 for a bearing assembly 13, that also supports shaft 10, and a second support member 14 for a bearing assembly 15 that supports output shaft 16 of transmission 3. Bevel pinion 17 is attached to output shaft 16 and is positioned within housing 5 to drive toothed crown wheel 18 of differential 2. Housing 6 of transmission 3 includes, in the vicinity of its second face 6b, a first support member 19 for a bearing assembly 20 for shaft 10 and a second support member 21 for a bearing assembly 22 that supports output shaft 16 of transmission 3. As indicated in broken lines in FIG. 1, an additional gear mechanism 23 can be coupled to transmission 3, making it possible to add an additional gear to the range of gears of the transmission. In this case, instead of normal cover 7, a deeper cover 7b is utilized to close the end of transmission 3. The connecting face of cover 7b is identical with the connecting face 7a of cover 7.

FIG. 2 depicts a variant of the manual transmission of FIG. 1, including additional gear mechanism 23, which provides a second motion output. Second output shaft 24 is an extension of output shaft 16 and extends in the direction opposite bevel pinion 17. The end of shaft 24 is provided with a coupling 25 for connection to a drive shaft (not shown) going to the rear wheels of the vehicle, and the assembly of the additional gear 23 and shaft end 24 is enclosed by a cover 26 whose front face 26a is connected to the face 6b of housing 6. Shaft 24 is supported in housing 26 by a bearing assembly 27. This variant is utilized with four wheel drive vehicles.

The variant of FIG. 3 is distinguished from those of FIG. 1 and FIG. 2 by the fact that the drive train does not include a differential between the clutch and manual transmission. Only clutch 1, with its housing 4 having two faces 4a, 4b, and manual transmission 3, with its housing 6 having two faces 6a, 6b, are provided. First face 6a of housing 6 is connected directly to second face 4b of housing 4. Transmission 3 is provided with additional gear mechanism 23, and the motion output is taken from shaft 24 and coupling 25. Housing 26 is utilized, with its face 26a connected to face 6b of housing 6. In this variant output shaft 16 of transmission 3 does not carry a bevel pinion for driving a differential; instead, its end is mounted by a bearing assembly 28 in support member 11 formed in second face 4b of housing 4 of clutch 1. This variant of the drive train of the present invention is intended for use in a rear wheel drive vehicle.

Figure 4:
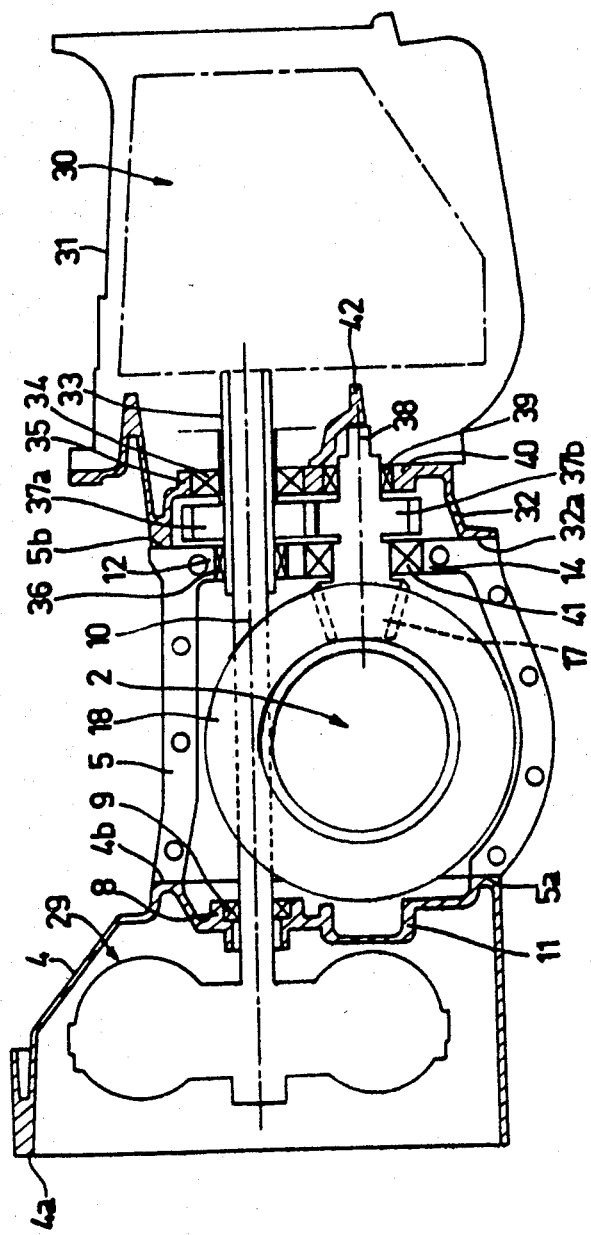
FIG. 4 is a schematic sectional view depicting another variant of the drive train of FIG. 1 including an automatic transmission and permitting front wheel drive.

FIG. 4 depicts a variant of the present invention for use with a front wheel drive vehicle and is distinguished from the variant of FIG. 1 by the fact that the manual clutch and manual transmission are replaced by a hydrokinetic torque converter 29 and an automatic transmission 30. In this variant, then, the drive train comprises, in line, torque converter 29, differential 2 and automatic transmission 30.

Torque converter 29 is mounted in housing 4, identical with the clutch housing 4 of FIG. 1. Housing 4 includes first face 4a for connecting to the engine housing (not shown) and second face 4b for connecting to the first face 5a of housing 5 of differential 2. Output shaft 10 from torque converter 29 passes through housing 5 to become the input shaft of transmission 30, being mounted by bearing assembly 9 in support member 8 of the second face 4b of housing 4. Housing 31 of automatic transmission 30 is connected to housing 5 of differential 2 by means of intermediate bearing support housing 32 whose first face 32a is connected to the second face 5b of housing 5 in the same manner as the corresponding second face of the manual transmission of FIG. 1. Output shaft 33 of automatic transmission 30 is tubular and encircles input shaft 10, being mounted for rotation by a bearing assembly 34 mounted in a support member 35 of intermediate housing 32 and by a bearing assembly 36 mounted in support member 12 of the second face 5b of housing 5 of differential 2. Shaft 33 carries, between bearing assemblies 34 and 36, a pinion 37a which meshes with a pinion 37b mounted on a lay shaft or intermediate shaft 38. Shaft 38 carries bevel pinion 17 to drive crown wheel 18 of differential 2. Intermediate shaft 38 is mounted by a bearing assembly 39 in a support member 40 of intermediate housing 32 and by a bearing assembly 41 mounted in support member 14 of second face 5b of housing 5. The axial thrust of bevel pinion 17 is supported by a stop 42 provided on intermediate housing 32.

Figure 5:
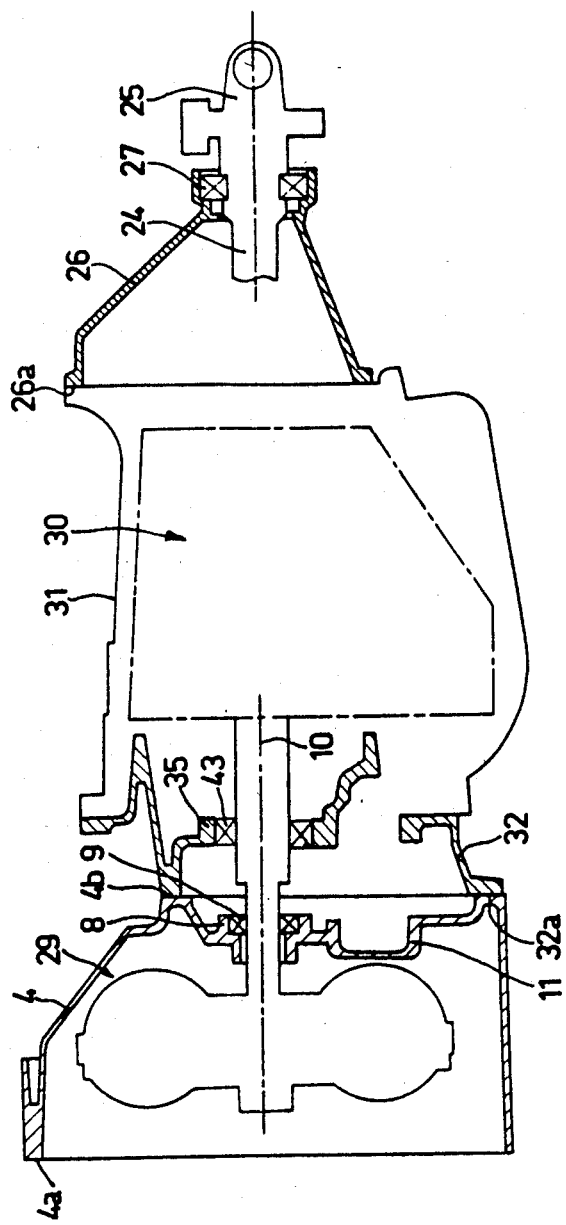
FIG. 5 depicts a variant of the drive train of FIG. 4 permitting rear wheel drive.

FIG. 5 depicts a further variant of the present invention for use with an automatic transmission drive train, but for use in a rear wheel drive vehicle. It is distinguished from the variant of FIG. 4 by the elimination of differential 2 between torque converter 29 and automatic transmission 30. This variant, therefore, comprises torque converter 29 and automatic transmission 30. Housing 4 of torque converter 29 and housing 31 of automatic transmission 30 are connected by means of intermediate bearing support housing 32 whose first face 32a is connected to second face 4b of housing 4 and whose second face is connected to housing 31. Shaft 10, connecting torque converter 29 to transmission 30, is mounted by bearing assembly 9 in support member 8 of second face 4b of housing 4 and by a bearing assembly 43 in support member 35 of intermediate housing 32. The motion output of automatic transmission 30 is obtained at shaft end 24 and coupling 25, similar to the variant of FIG. 3.

In accordance with this first embodiment of the present invention, face 4b of housing 4, faces 5a and 5b of housing 5, face 6a of housing 6, and face 32a of housing 32 are preferably identical, and in any case can interchangeably be connected to one another.

A comparison of the variants of the first embodiment of the present invention, as described and depicted in FIGS. 1 through 5, shows that the drive train can be made in the manual version and in the automatic version, with two different motion outputs, permitting front wheel drive, rear wheel drive, and/or four wheel drive as desired, utilizing an optimal number of identical or corresponding constituent elements. Thus, in the manual drive train and in the automatic drive train the housings of the clutch and of the torque converter are identical, the differential housings are identical, and the housings of the manual transmission and of the automatic transmission can be connected in the same way, with the simple addition of an intermediate bearing support housing in the automatic drive train, as desired, to the housing of the clutch or the torque converter and to the differential housings. Consequently, the two faces of the differential housings are symmetrical. For drive trains for rear wheel drive or four wheel drive vehicles, the motion output of the transmission utilizes the same elements in the manual version and in the automatic version.

Figure 6:
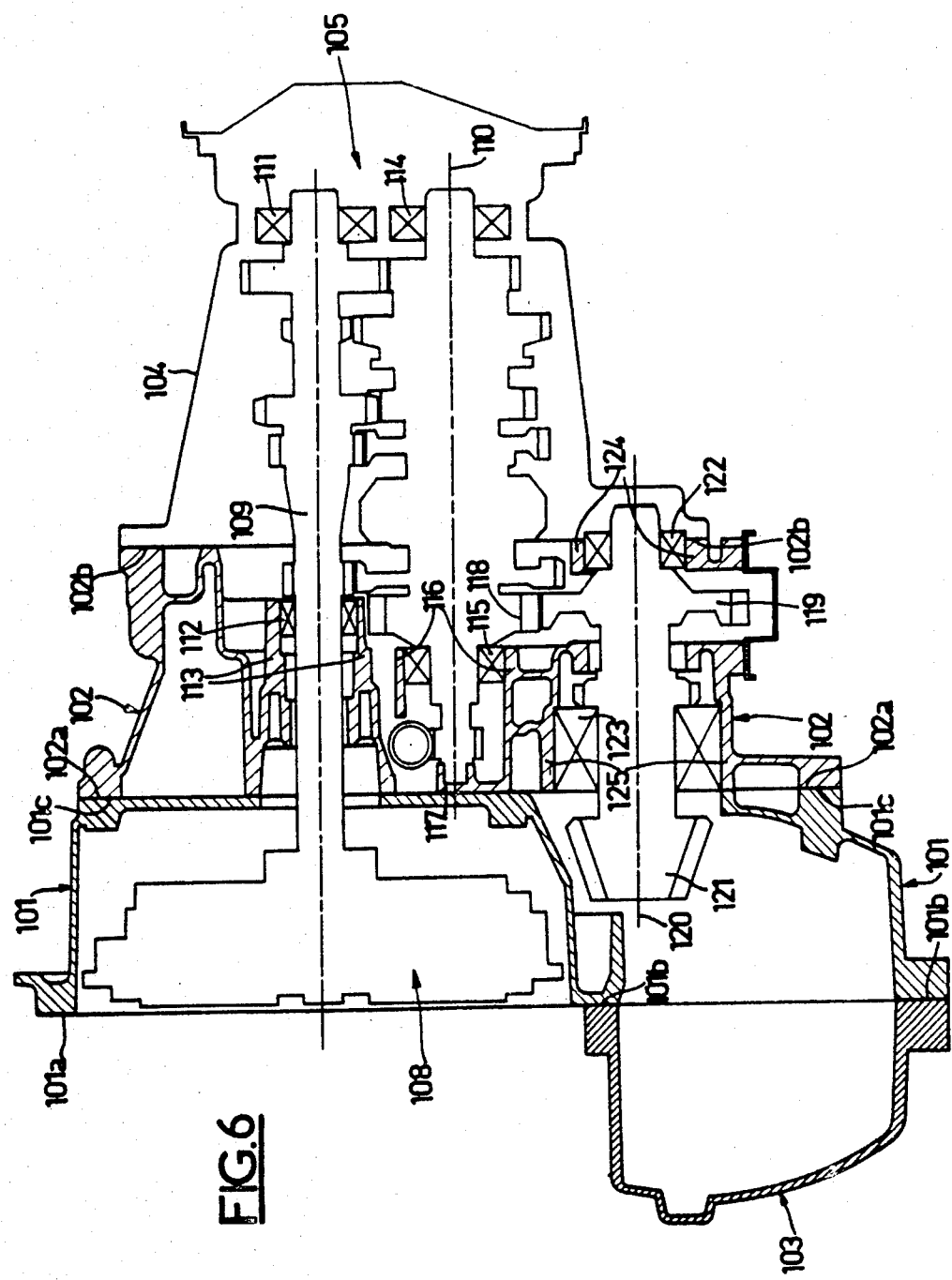
FIG. 6 is a schematic sectional view depicting a second embodiment of a drive train according to the present invention including a manual transmission and permitting front wheel drive.
Figure 7:
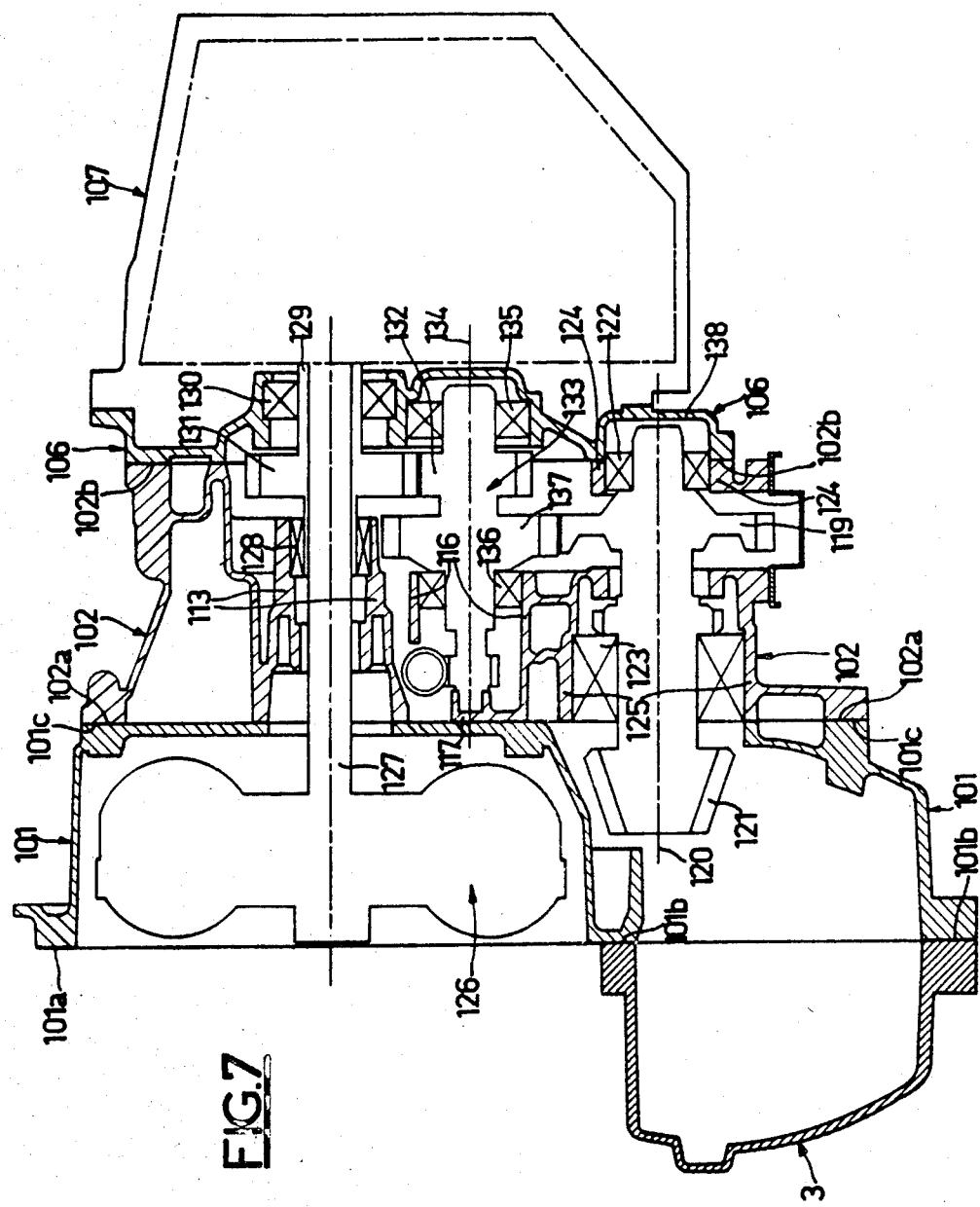
FIG. 7 depicts a variant of the drive train of FIG. 6 including an automatic transmission.

FIGS. 6 and 7 depict a second embodiment of the present invention. In this embodiment the housing of the longitudinal drive train, common to the manual drive train and the automatic drive train represented respectively in FIG. 6 and in FIG. 7, is made up of a first housing part 101, a second housing part 102 and a differential cover 103. The first housing part 101 includes a first face, having portions 101a and 101b, and a second face 101c. The two faces of housing part 101 are substantially parallel. Housing part 101 can be fastened along part 101a of its first face directly to the vehicle engine (not shown), with the two faces of housing part 101 substantially perpendicular to the drive shaft of the vehicle. Differential cover 103 is connected to part 101b of the same face of first housing part 101. Differential cover 103 encloses the major part of the vehicle differential mechanism (not shown).

At its other face 101c, first housing part 101 is connected to one of the faces 102a of the second housing part 102. The other face 102b of second housing part 102, which is parallel to face 102a, is provided for connection, in the manual drive train shown in FIG. 6, directly to housing 104 of a manual transmission 105 whose components are represented schematically in FIG. 6. In the automatic drive train, shown in FIG. 7, face 102b of second housing part 102 is connected to an intermediate bearing support housing 106 which, in turn, is fastened to housing 107 of an automatic transmission whose components are represented schematically in FIG. 7.

In the manual drive train of FIG. 6, clutch 108, which is shown schematically in FIG. 6 and which might be a friction clutch, is housed within the first housing part 101, between the parallel faces 101a and 101c thereof. The manual transmission mechanism 105 includes an input shaft 109 and an output shaft 110 which carry different pairs of pinions, assuring, in a standard manner, the desired drive ratios. Input shaft 109 is coaxial with the shaft of the engine (not shown) and is connected to this shaft by clutch 108. Input shaft 109 is supported by a ball bearing assembly 111 and a roller bearing assembly 112. Roller bearing assembly 112 is mounted in a support member 113 formed as an integral part of second housing part 102.

Output shaft 110 is supported adjacent its two ends by a ball bearing assembly 114 and a cylindrical roller bearing assembly 115. Roller bearing assembly 115 is mounted in a support member 116 that is an integral part of second housing part 102. One end of output shaft 110 extends into a support member 117 made as an integral part of second housing part 102.

Output shaft 110 carries a spur pinion 118 which meshes with a pinion 119 on shaft 120 which also carries input bevel pinion 121 of the differential. Shaft 120 is mounted adjacent its two ends by a cylindrical roller bearing assembly 122 and a bearing assembly 123 with a double row of conical rollers. Bearing assemblies 122 and 123 are mounted in suitable support members 124 and 125 made as integral parts of housing part 102 adjacent respectively, faces 102b and 102a. Shaft 120 extends into housing part 101 to position bevel pinion 121 therein.

In the automatic drive train shown in FIG. 7, first housing part 101, which encloses the friction clutch 108 of manual version, instead encloses, without modification, a hydrokinetic torque converter 126, shown schmatically in FIG. 7. The turbine of torque converter 126 is connected by primary support shaft 127 to the automatic transmission within housing 107. Output shaft 129 of the automatic transmission is supported by a needle bearing assembly 128 mounted in support member 113 of second housing part 102. Output shaft 129 is also held axially by an angular contact ball bearing assembly 130 mounted in intermediate bearing support housing 106. Shaft 129 carries motion output pinion 131 of the transmission 107 which meshes with teeth 132 of intermediate double pinion 133 mounted on lay shaft or intermediate shaft 134. Intermediate shaft 134 is supported adjacent its two ends by a ball bearing assembly 135, mounted in a portion of intermediate bearing support housing 106, and a cylindrical roller bearing assembly 136, mounted in support member 116 of housing part 102. The end of intermediate shaft 134 extends into support member 117 of second housing part 102.

The second teeth 137 of intermediate double pinion 133 mesh with pinion 119 which drives shaft 120 of the differential input bevel pinion. This shaft is identical with that of the manual version shown in FIG. 6 and is mounted in the same way. Bearing support housing 106 includes a support member 138 supporting bearing assembly 122 and the end of shaft 120.

Because of the particular arrangement and structure of parts of the housing assembly according to the present invention, it is possible to use the same differential and same input bevel pinion for the manual drive train and the automatic drive train. The spacings between the different shafts are the same in both versions, and it is possible to mount the support bearings of the different shafts identically in the two versions. Further, it is possible to use, for the two versions, the same drive shaft of the differential bevel pinion.

The present invention makes it possible to reduce investment, by simplifying the parts used, and to provide the automatic drive train with the benefits resulting, in regard to the elements common to the manual drive train, from the lower cost associated with the large mass production of the manual drive train.

Although the present invention has been described with reference to preferred embodiments, numerous rearrangements and substitutions could be made, and still the result would be within the scope of the invention.

What is claimed is:

1. A housing assembly for a transmission unit in an automotive vehicle, said housing assembly including a first housing and a second housing, said first housing having first and second faces located at its opposite ends, said first face being connectible to an engine housing, said first housing having space between said faces capable of receiving a power transmitting means comprising a manual clutch, said space also being capable of receiving a power transmitting means comprising a hydrokinetic torque converter,
   a partition wall which is located near said second face and is provided with a hole which permits a transmission input shaft from a power transmitting means to pass therethrough,
   first bearing support means on the partition wall for supporting a shaft which passes through the hole, and
   second bearing support means on the partition wall for supporting an output shaft of a manual shift gearbox.

2. The invention of claim 1 in combination with the following:
   a manual clutch located in said first housing,
   a manual shift gearbox,
   a transmission input shaft extending from the manual clutch, through the hole and to the manual shift gearbox, said transmission input shaft being supported by said first bearing support means.

3. The invention of claim 1 in combination with the following:
   a hydrokinetic torque converter in said first housing,
   an automatic gearbox,
   a transmission input shaft extending from the hydrokinetic torque converter, through the hole and to the automatic gearbox, said transmission input shaft being supported by said first bearing support means.

4. A housing assembly for a transmission unit in an automotive vehicle, said housing assembly including a first housing and a second housing, said first housing having first and second faces located at its opposite ends, said first face being connectible to an engine housing, said first housing having space between said faces capable of receiving a power transmitting means comprising a manual clutch, said space also being capable of receiving a power transmitting means comprising a hydrokinetic torque converter,
   a partition wall which is located near said second face and is provided with a hole which permits a transmission input shaft from a power transmitting means to pass therethrough,
   first bearing support means on the partition wall for supporting a shaft which passes through the hole, and
   second bearing support means on the partition wall for supporting an output shaft of a manual shift gearbox,
   said second housing having first and second faces located at its opposite ends and a space between said faces for containing a differential which has a bevel gear driven by a bevel pinion, said first face of the second housing being connected to the second face of the first housing, said second face of the second housing being connectible interchangeably to a manual shift gearbox housing and to an intermediate bearing support housing,
   first bearing support means on said second housing for supporting interchangeably (i) a transmission input shaft which extends through the hole in the partition and (ii) a gearbox output shaft which is coaxially mounted about such a transmission input shaft,
   second bearing support means on said second housing for supporting interchangeably (iii) a gearbox output shaft which carries a bevel pinion and (iv) an intermediate shaft which carries a bevel pinion driven by a gearbox output shaft.

5. The invention of claim 4 in combination with the following:
   a differential which has a bevel gear driven by a bevel pinion, said differential being located in the space in the second housing,
   a manual shift gearbox housing connected to the second face of the second housing, a manual shift gearbox located in said manual shift gearbox housing, a manual clutch located in said space capable of receiving a power transmitting means, a transmission input shaft extending from the manual clutch, through the hole and to the manual transmission gearbox, said transmission input shaft being supported by said first bearing support means on said partition wall and by said first bearing support means on said second housing, a gearbox output shaft which carries a bevel pinion which is engaged with the bevel gear of the transmission, said gearbox shaft being supported by said second bearing support means on said second housing.

6. The invention of claim 4 in combination with the following:

a differential which has a bevel gear driven by a bevel pinion, said differential being located in the space in the second housing, an automatic gearbox housing connected to the second face of the second housing, an automatic gearbox located in said automatic gearbox housing, a hydrokinetic torque converter located in said space capable of receiving a power transmitting means, a transmission input shaft extending from the hydrokinetic torque converter, through the hole and to the automatic gearbox, said transmission input shaft being supported by said first bearing support means on said partition wall, a gearbox output shaft coaxially mounted about the transmission input shaft, said gearbox output shaft being supported by said first bearing support means on said second housing, an intermediate shaft driven by the automatic gearbox and having thereon an intermediate pinion which is driven by the gearbox output shaft, said intermediate shaft being supported by the second bearing support means on the second housing and having thereon a bevel pinion which is engaged with the bevel gear of the differential.

7. A housing assembly according to claim 1 said second housing being a housing for a manual shift gearbox, said second housing being connected to the second face of the first housing.

8. The invention according to claim 7 in combination with a manual clutch comprising a power transmitting means in said space, a manual shift gearing in the second housing to provide a manual shift gearbox, and a shaft extending through said hole from the manual clutch to the manual shift gearbox.

9. A housing assembly according to claim 1 wherein said second housing contains an intermediate shaft driven by an automatic gearbox, said another housing being connected to the second face of the first housing.

10. The invention according to claim 9 in combination with a hydrokinetic torque converter comprising a power transmitting means in said space, automatic gearing in the second housing to provide an automatic gearbox, and a shaft extending through said hole from the hydrokinetic torque converter to the automatic gearbox.

11. A method of manufacturing automotive transmission units comprising the steps of, providing identical first housings each having means for accommodating therewithin a power transmitting means, providing identical second housings each having means for accommodating therewithin a differential which has a bevel gear driven by a bevel pinion, providing identical third housings each having means for accommodating therewithin a manual shift gearbox, providing identical fourth housings each having means for accommodating therewithin a first pinion and a second pinion which is driven by the first pinion and is drivingly engageable with the differential, providing identical fifth housings each having means for accommodating therewithin an automatic gearbox, assembling manual transmissions for front wheel drive vehicles by performing the following steps in any sequence: installing a clutch in a first housing, installing a bevel gear differential in the second housing, installing a manual shift gearbox in the third housing, and connecting together the first, second and third housings with the second housing located between the first and third housings;

assembling automatic transmissions for front wheel drive mechanisms by performing the following steps in any sequence: installing a hydrokinetic torque converter in a first housing, installing a bevel gear differential in a second housing, installing an automatic gearbox in a fifth housing, installing in the fourth housing a first pinion driven by the automatic gearbox and a second pinion which is driven by the first pinion and is attached to a bevel gear of the differential, and connecting together the first, second, fourth and fifth housings with the second housing located between the first and fourth housing, and the fourth housing located between the second and fifth housing;

assembling manual transmissions for rear wheel drive vehicles by performing the following steps in any sequence: installing a clutch in a first housing, installing a manual shift gearbox in the third housing, and connecting together the first and third housings;

assembling automatic transmissions for rear wheel drive vehicles by performing the following steps in any sequence: installing a hydrokinetic torque converter in a first housing, installing an automatic gearbox in a fifth housing and connecting together the first, fourth and fifth housings with the fourth housing being located between the first and fifth housings.

12. A method of manufacturing automatic transmission units comprising the steps of, providing a plurality of identical first housings each of which has substantially isolated first and second spaces for accommodating therewithin, respectively, a power transmitting means and a differential, providing a plurality of identical second housings each of which has means therewithin for accommodating and supporting a plurality of gears, providing a plurality of third housings which have means therewithin for accommodating and supporting the components of a manual shift gearbox, providing a plurality of fourth housings which have therewithin means for accommodating and supporting the components of an automatic shift gearbox, assembling manual transmissions by performing the following steps in any sequence: installing a manual clutch in the first space of a first housing, installing the components of a manual shift gearbox in the third housing, installing in the second housing a set of gears which is driven by the manual shift gearbox and is connected to a bevel pinion of a differential which is in said second space, and connecting the housings together with the second housing located between the first and third housings, assembling automatic transmissions by performing the following steps in any sequence: installing a hydrokinetic torque converter in the first space of a first housing, installing the components of an automatic gearbox in a fourth housing, installing in the second housing a set of gears which is driven by the automatic gearbox and is connected to a bevel pinion of a differential which is in said second space, and connecting the housings together with the second housing located between the first and fourth housings.

* * * * *